(12) United States Patent
Nastacio

(10) Patent No.: US 8,132,090 B2
(45) Date of Patent: Mar. 6, 2012

(54) DYNAMIC CREATION OF SYMPTOM DATABASES FROM SOCIAL BOOKMARKS

(75) Inventor: Denilson Nastacio, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 12/185,175

(22) Filed: Aug. 4, 2008

(65) Prior Publication Data

US 2010/0031133 A1 Feb. 4, 2010

(51) Int. Cl.
*G06F 17/24* (2006.01)
*G06F 17/21* (2006.01)

(52) U.S. Cl. ......... 715/206; 715/738; 715/745; 715/760

(58) Field of Classification Search .................. 715/206, 715/738, 741, 745, 760
See application file for complete search history.

(56) References Cited

U.S. PATENT DOCUMENTS

| | | | |
|---|---|---|---|
| 5,917,491 A * | 6/1999 | Bauersfeld | 715/810 |
| 6,526,424 B2 * | 2/2003 | Kanno et al. | 715/229 |
| 7,461,087 B2 * | 12/2008 | Woods et al. | 1/1 |
| 7,523,096 B2 * | 4/2009 | Badros et al. | 1/1 |
| 7,685,200 B2 * | 3/2010 | Gunawardena et al. | 707/748 |
| 2001/0011285 A1 * | 8/2001 | Kanno et al. | 707/512 |
| 2002/0147742 A1 * | 10/2002 | Schroeder | 707/501.1 |
| 2003/0177414 A1 | 9/2003 | Pillutla et al. | |
| 2005/0022132 A1 * | 1/2005 | Herzberg et al. | 715/759 |
| 2005/0097396 A1 | 5/2005 | Wood | |
| 2006/0106796 A1 | 5/2006 | Venkataraman et al. | |
| 2007/0174260 A1 | 7/2007 | Bachman et al. | |
| 2007/0283273 A1 * | 12/2007 | Woods | 715/738 |
| 2008/0215553 A1 * | 9/2008 | Badros et al. | 707/3 |
| 2008/0215583 A1 * | 9/2008 | Gunawardena et al. | 707/7 |
| 2010/0131856 A1 * | 5/2010 | Kalbfleisch et al. | 715/741 |

OTHER PUBLICATIONS

Boeglin, Michael, "Implementing an intranet-based library help system," Computers in Libraries (ICLB), Nov. 1997, p. 24-26, v17 n10.

* cited by examiner

*Primary Examiner* — Nicholas Augustine
(74) *Attorney, Agent, or Firm* — Cahn & Samuels, LLP

(57) ABSTRACT

A method for the dynamic creation of a symptom database from at least one social bookmark includes bookmarking a webpage comprising a solution to a problem using a web browser; defining a bookmark for the webpage by editing a bookmark field to characterize the solution by at least one of a text or numeric identifier and by providing at least one tag to classify the solution by at least one of product, topic, enterprise, or database; and automatically storing the bookmark in at least one symptom database. In response to a query for a solution to the problem, the bookmark is provided.

14 Claims, 4 Drawing Sheets

FIG. 1

DYNAMIC CREATION OF SYMPTOM DATABASES FROM SOCIAL BOOKMARKS

FIELD OF THE INVENTION

This invention relates to a system and methods for the dynamic creation of symptom databases or catalogs from social bookmarks.

BACKGROUND OF THE INVENTION

A symptom database or catalog is a collection of patterns and recommendations that can be used to comb through a series of artifacts. In a more specific embodiment, IBM Log Analyzer can use a symptom database to comb through or scan log entries for patterns, displaying all matches to help a support analyst find a solution to a customer's problems. As shown in FIG. 1, a user (such as a support engineer) scans log entries 100 imported or uploaded from a customer using IBM Log Analyzer 105 and employs symptom database 110 to identify a particular problem, i.e., selected log entry 115 (WSR0036E).

However, the creation of symptom databases or catalogs for problem resolution requires (1) someone to sit down and write their expertise in a standard format, and/or (2) the automatic mining of existing knowledge bases. These approaches have significant drawbacks. It is not only difficult to get people to sit in front of an editing tool, but it is also important that the person still remembers the problem solution when the symptom definition is being authored. The mining of data requires the data to be inside the knowledge database in the first place. Yet, sometimes support engineers forget to paste the relevant files inside the knowledge database.

Thus, there remains a need for the dynamic creation of a symptom database in which problem solutions can be easily and timely identified, stored in a database or repository, and are accessible to a large number of people, such as a division, corporation, enterprise, or other entity.

SUMMARY OF THE INVENTION

According to an aspect of the present invention, a method for the dynamic creation of a symptom database from at least one social bookmark is provided. Using a web browser, a webpage comprising a solution to a problem is bookmarked. The bookmark for the webpage is defined by editing a bookmark field to characterize the solution by at least one of a text or numeric identifier and by providing at least one tag to classify the solution by at least one of product, system, topic, enterprise, or database. The bookmark is automatically stored in at least one symptom database. In response to a query for a solution to the problem, the bookmark is provided.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the system and methods should become evident to a person of ordinary skill in the art.

BRIEF DESCRIPTION OF THE DRAWINGS

FIG. 1 is a screenshot in which customer logs are scanned to analyze problems using a symptom database.

DETAILED DESCRIPTION OF THE DRAWINGS

Figure 2:
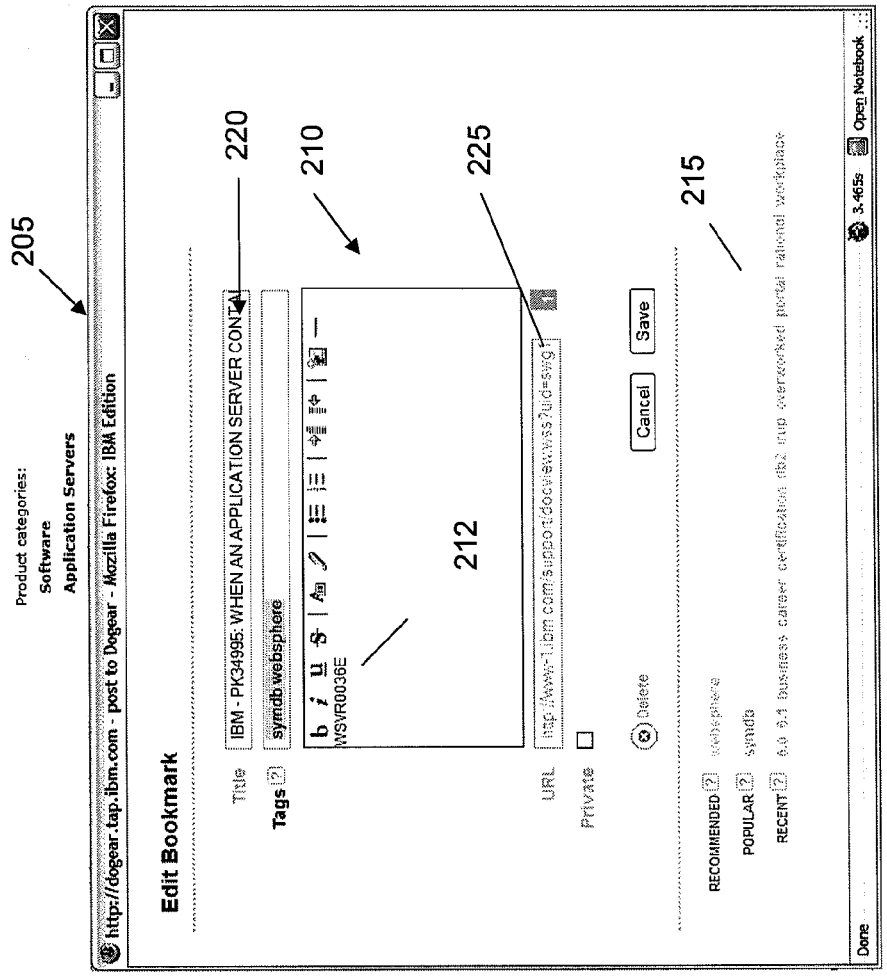
FIG. 2 is a screenshot of bookmarking a solution to dynamically create a symptom database according to an embodiment of the present invention.
Figure 3:
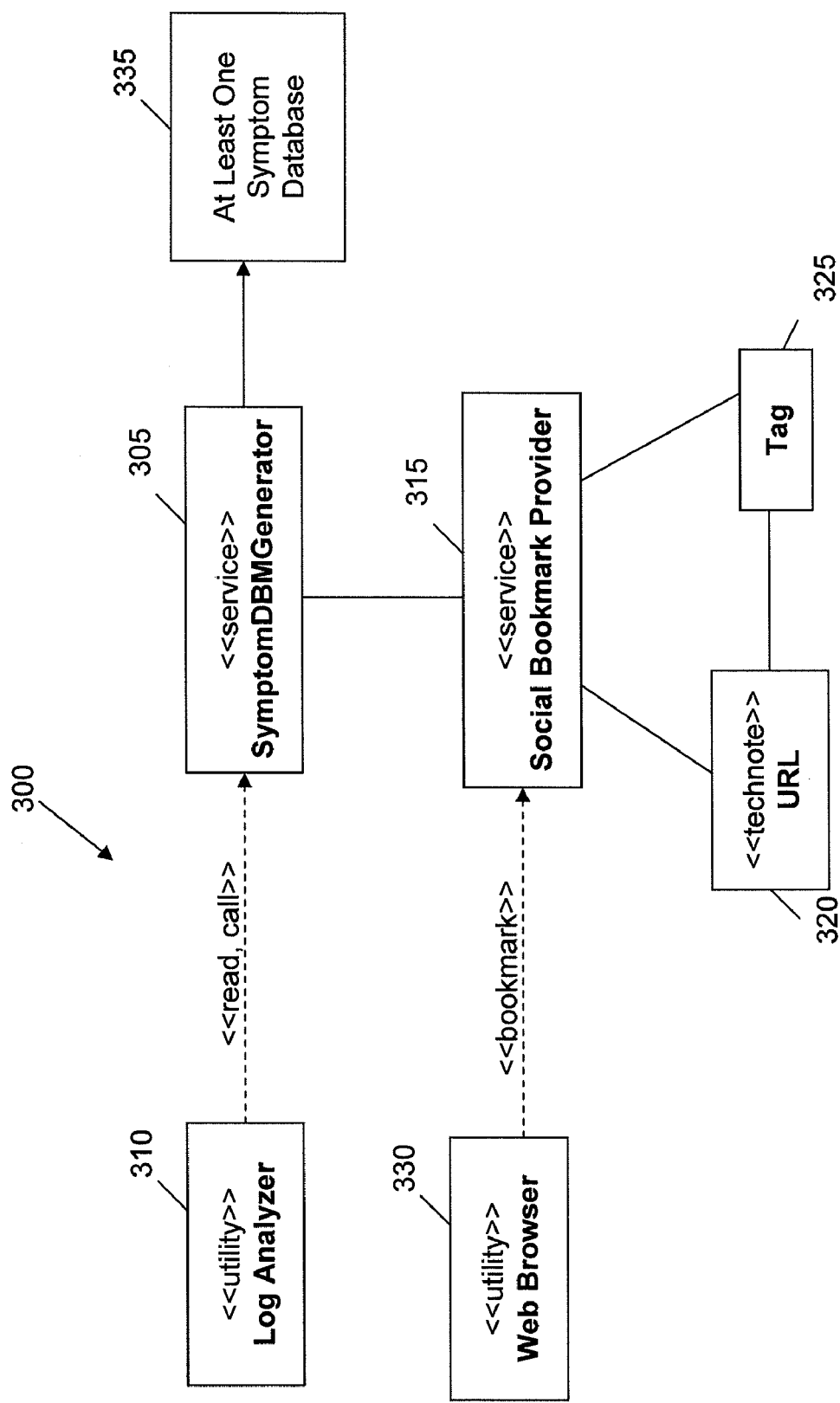
FIG. 3 is a block diagram of a system according to an embodiment of the present invention.
Figure 4:
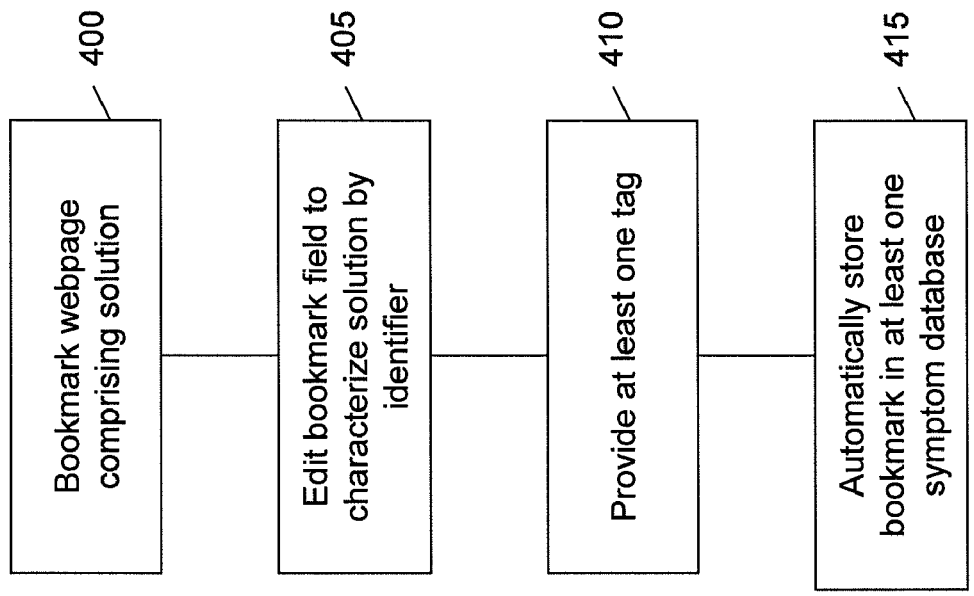
FIG. 4 is a flowchart of a method according to an embodiment of the present invention.

FIGS. 2-4 illustrate a system and methods for the dynamic creation of at least one symptom database or catalog from social bookmarks. According to the present invention, using social bookmarking, individuals may manually and automatically associate or tie specific solutions to problems in at least one symptom database or catalog. The present invention advantageously uses existing tooling, such as web browsers, and allows for a timely, comprehensive, and dynamic creation of at least one symptom database which can be easily shared.

Figure 1:
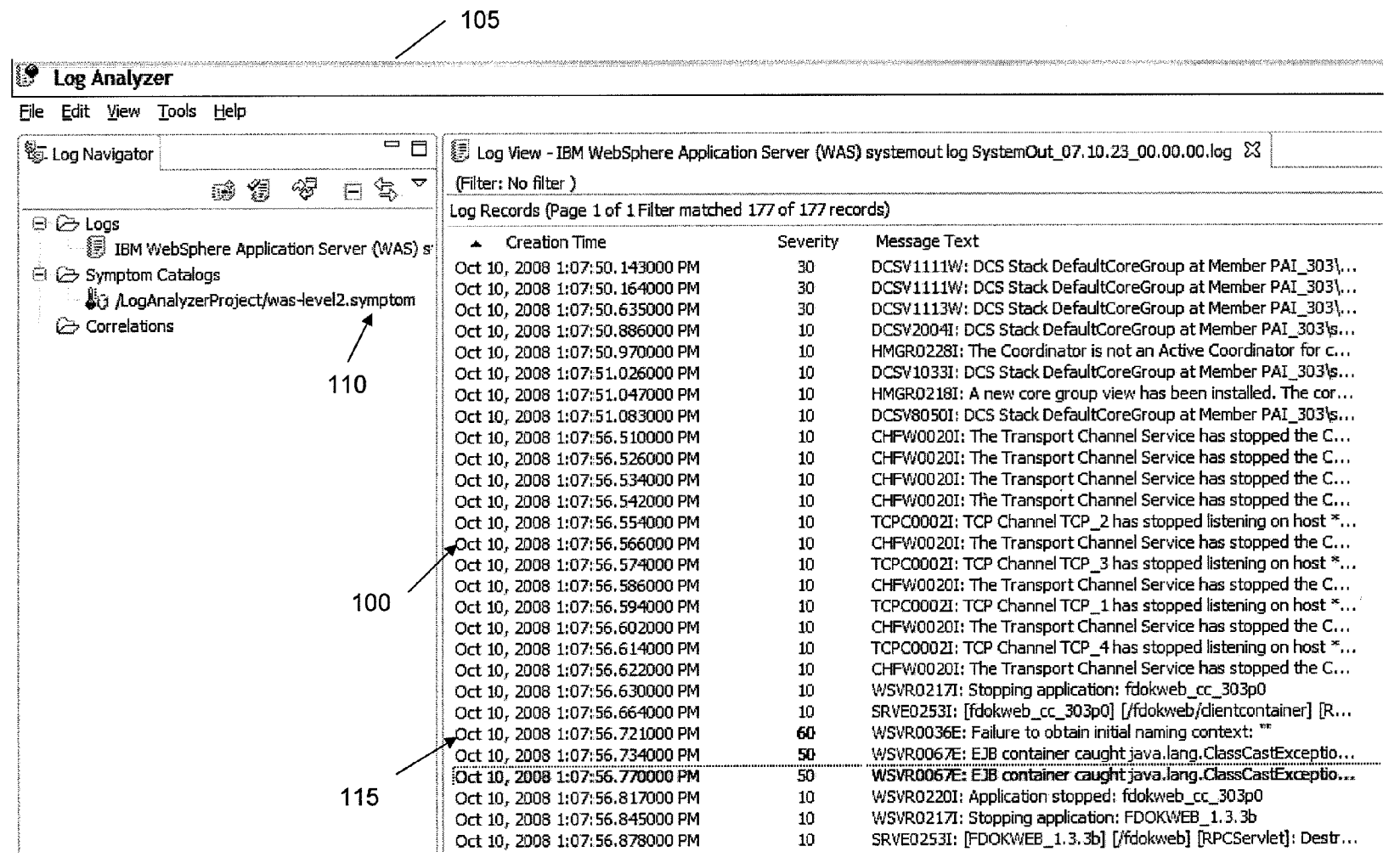

According to the present invention, users employ a social bookmarking tool (e.g., bookmark buttons, icons, or menus in web browsers) to bookmark at least one webpage describing a solution to a problem. For example, as illustrated in FIG. 2, for selected log entry 115 (WSR0036E) of FIG. 1, a user or support engineer searches for and finds a webpage comprising a solution or fix (PK34995) 200 for the customer problem. The support engineer bookmarks the solution 200, for example, by clicking on a bookmark icon in a web browser (e.g., Del.icio.us, Dogear). A bookmark window 205 is presented.

According to the present invention, users may edit a description field in the bookmark to provide at least one of a text or a numeric identifier or marker. In embodiments, the identifier or marker characterizes or describes the problem which the bookmarked solution solves. As shown in FIG. 2, a user or support engineer edits the bookmark window, for example, a description field 210. In the description field, the support engineer may identify the solution by a numeric identifier 212, such as log entry WSR0036E corresponding to a specific customer problem.

A user may associate at least one tag 215 with the bookmark. The at least one tag may comprise a keyword that helps classify the solution, for example, by at least one of product (e.g., websphere); system (e.g., version, portal, or device); enterprise (e.g., division, career, or personnel); by topic (e.g., security, administration); or by database.

In embodiments, a tag for the bookmark may be recommended to the user. For example, a popular tag or a recent tag may be provided for the user's consideration. A user may manually create or select at least one tag for a bookmark. In embodiments, the bookmark may comprise a window in a graphical user interface that is pre-populated with information, for example, at least one of tag 215, title 220, or web address (URL) 225.

As illustrated in FIG. 2, the bookmark may contain the following information to define the solution and to dynamically create at least one symptom database:

1. Title 220. The Title of a bookmark may be automatically given by a social bookmarking extension for a web browser or may be manually provided by a user. The Title may serve as a symptom name.

2. Web address 225. The web address or URL may be automatically captured upon bookmaking a solution, for example, when a bookmark button in a web browser is pressed. The web address may serve as a symptom recommendation.

3. Problem Identifier 212. For example, in embodiments, a log signature or entry may be typed into the bookmark description field 210. The problem identifier should not prevent it from being matched to similar problems with a different circumstance (e.g., the identification of a timestamp would not be appropriate as it would most likely not rediscover a similar problem in a different file).

4. At least one Tag 215. For example, a symptom database tag (e.g., symdb) would result in a bookmarked web address being a component the at least one symptom database.

In embodiments, a user may provide at least one definition for a single bookmark. Thus, a single bookmarked webpage may have several definitions. A user may specify a rule that the bookmarked solution equals, contains, or looks like the identifier.

FIG. 3 illustrates a block diagram of a system 300 according to an embodiment of the present invention. The system comprises a Symptom Database Generator (SymptomDB-Generator) 305 that receives requests or calls from a user corresponding to a problem, for example via an entry in Log Analyzer 310. A Social Bookmark Provider 315 provides a bookmark comprising a web address (e.g., URL via for example IBM technotes) 320 and at least one tag 325 for a solution to the problem. The Social Bookmark Provider searches for a bookmark using a web browser 330. The Social Bookmark Provider may comprise a public or private set of bookmarks. In embodiments, the Symptom Database Generator converts results from the Social Bookmark Provider into at least one symptom database 335. The Symptom Database Generator may query the Social Bookmark Provider from a local or remote location.

FIG. 4 is a flowchart of a method for the dynamic creation of a symptom database from at least one social bookmark. A webpage is bookmarked comprising a solution to a problem using a web browser 400. At least one definition for the bookmark is provided by editing a bookmark field to characterize the solution by at least one of a text or numeric identifier 405 and by providing at least one tag to classify the solution by at least one of product, system, topic, enterprise, or database 410. The bookmark is automatically stored in at least one symptom database 415.

EXAMPLE

A user bookmarks a website for a solution, and provides an identifier and several tags:
Title: XYZ
URL: http://ibm.com/technoteXYZ
Identifier: abc
Tags: symdb websphere portal rpm
The Symptom Database Generator accordingly stores a symptom in three symptom databases as:
Title: XYZ
Rule: contains abc
Recommendation: http://ibm.com/technoteXYZ
The symptom databases correspond to the respective tags: websphere, portal, and rpm.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The exemplary and alternative embodiments described above may be combined in a variety of ways with each other. Furthermore, the steps and number of the various steps illustrated in the figures may be adjusted from that shown.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

I claim:

1. A method for creating a symptom database, comprising:
   dynamically creating at least one symptom database from at least one social bookmark comprising:
   using a computer to connect to a web browser to search for a solution to a problem;
   bookmarking at least one webpage comprising the solution to the problem using a social bookmarking tool;
   presenting a bookmark window in a graphical user interface;
   defining a bookmark for the at least one webpage in the bookmark window by:
   a) editing a bookmark field with at least one of a text or numeric identifier that describes the problem;
   b) specifying a rule that a bookmarked solution equals, contains, or looks like the at least one of a text or numeric identifier; and
   c) providing at least one tag to classify the solution;
   storing the bookmark in the at least one symptom database as a symptom comprising a title that serves as a symptom name; a web address for the at least one webpage that serves as a symptom recommendation; the rule comprising the at least one of a text or numeric identifier; and the at least one tag; and
   wherein, in response to a query for the solution to the problem, the bookmark is provided.

2. A method according to claim 1, wherein the bookmark comprises several tags, each tag corresponding to a separate symptom database.

3. A method according to claim 1, wherein said at least one tag classifies the solution by at least one of product, system, topic, enterprise, or database.

4. A method according to claim 1, wherein said at least one tag classifies the solution by a product.

5. A method according to claim 1, wherein said at least one tag classifies the solution by system version or device.

6. A method according to claim 1, wherein said at least one tag classifies the solution by an enterprise division, career, or personnel.

7. A method according to claim 1, wherein a numeric identifier describes a problem.

8. A method according to claim 7, wherein the numeric identifier comprises a log entry or signature.

9. A method according to claim 1, wherein said window comprises:
   a description field for the at least one of a text or numeric identifier;
   a pre-populated list of recommended, recent, and popular tags;
   a pre-populated web address field for the at least one webpage; and
   a title field.

10. A method according to claim 9, wherein the bookmark window further comprises a field to mark whether the bookmark is private.

11. A method according to claim 1, wherein the computer comprises a local computer that is connected to a remote computer via a network.

12. A computer program product, comprising:
    a computer useable storage medium having a computer readable program code, wherein the computer readable program code when executed on a computer causes the computer to:
    dynamically create a symptom database from at least one social bookmark comprising:
    search for a solution to a problem;
    bookmark at least one webpage comprising the solution to the problem using a social bookmarking tool;
    present a bookmark window in a graphical user interface;
    define a bookmark for the at least one webpage in the bookmark window by a) editing a bookmark field with at least one of a text or numeric identifier that describes the problem; b) specifying a rule that a bookmarked solution equals, contains, or looks like the at least one of a text or numeric identifier; and c) providing at least one tag to classify the solution;
    store the bookmark in at least one symptom database as a symptom comprising a title that serves as a symptom name; a web address for the at least one webpage that serves as a symptom recommendation; the rule comprising the at least one of a text or numeric identifier; and the at least one tag; and
    provide the bookmark in response to a query for the solution to the problem.

13. The computer program product according to claim 12, wherein the computer useable storage medium comprises an electronic, magnetic, optical, electromagnetic, infrared, or semiconductor apparatus.

14. A method according to claim 1, wherein the at least on webpage comprises a solution to a customer problem.

* * * * *